(12) United States Patent
Zhang et al.

(10) Patent No.: US 7,426,710 B2
(45) Date of Patent: *Sep. 16, 2008

(54) STANDARD CELL LIBRARY HAVING CELL DRIVE STRENGTHS SELECTED ACCORDING TO DELAY

(75) Inventors: Xiaonan Zhang, Palo Alto, CA (US); Michael Xiaonan Wang, Stanford, CA (US)

(73) Assignee: VeriSilicon Holdings, Co. Ltd., Santa Clara, CA (US)

(*) Notice: Subject to any disclaimer, the term of this patent is extended or adjusted under 35 U.S.C. 154(b) by 121 days.

This patent is subject to a terminal disclaimer.

(21) Appl. No.: 11/273,839

(22) Filed: Nov. 15, 2005

(65) Prior Publication Data

US 2006/0107239 A1 May 18, 2006

Related U.S. Application Data (63) Continuation-in-part of application No. 10/856,345, filed on May 27, 2004, now Pat. No. 7,254,802.

(51) Int. Cl.
*G06F 17/50* (2006.01)
(52) U.S. Cl. ............... 716/17; 716/3; 716/6; 716/9; 716/10
(58) Field of Classification Search ............... 716/17, 716/1, 2, 3, 6, 9, 10
See application file for complete search history.

(56) References Cited

U.S. PATENT DOCUMENTS

| | | | | |
|---|---|---|---|---|
| 3,622,762 A * | 11/1971 | Dyer et al. | ...................... | 716/4 |
| 4,698,760 A * | 10/1987 | Lembach et al. | ............... | 716/6 |
| 4,827,428 A * | 5/1989 | Dunlop et al. | .................. | 716/6 |
| 5,388,055 A * | 2/1995 | Tanizawa et al. | ............... | 716/9 |
| 5,459,673 A * | 10/1995 | Carmean et al. | ................ | 716/6 |
| 5,598,347 A * | 1/1997 | Iwasaki | .......................... | 716/8 |
| 5,633,805 A * | 5/1997 | Simonsen | ..................... | 716/18 |
| 5,663,662 A * | 9/1997 | Kurosawa | ..................... | 326/41 |
| 6,591,407 B1 * | 7/2003 | Kaufman et al. | .............. | 716/10 |

* cited by examiner

*Primary Examiner*—Sun J Lin
(74) *Attorney, Agent, or Firm*—Lumen Patent Firm, Inc.

(57) ABSTRACT

A cell library which enables reduced quantization over-design in large scale circuit design is provided. Library cells having the same cell function have drive strengths selected to provide delays about equal to a predetermined set of design delays, at a nominal load corresponding to the cell function. In contrast, conventional cell libraries typically have drive strengths which correspond to a predetermined set of cell physical areas. Preferably, the spacing between adjacent design delays is a non-decreasing function of cell drive strength. Such spacing reduces quantization induced overdesign compared to conventional cell libraries which have a design delay spacing that is a decreasing function of cell drive strength. On-chip clock distribution is an important application where cell libraries of the invention can provide significant advantages.

15 Claims, 6 Drawing Sheets

STANDARD CELL LIBRARY HAVING CELL DRIVE STRENGTHS SELECTED ACCORDING TO DELAY

CROSS REFERENCE TO RELATED APPLICATIONS

This application is a continuation in part of application Ser. No. 10/856,345, filed on May 27, 2004 now U.S. Pat. No. 7,254,802 and entitled "Standard Cell Library Having Cell Drive Strengths Selected According to Delay".

FIELD OF THE INVENTION

This invention relates to the automatic design of large scale circuits.

BACKGROUND

Design of large scale electrical circuits is frequently automated by provision of a library of standard cells for performing various circuit functions. In typical large scale circuits (also referred to as VLSI circuits), standard cell circuitry typically occupies from 50% to 70% of the circuit area, with the remainder being memory. Most of the power consumption (both switching power and leakage power) is in the standard cell circuitry.

Cell library functions can include, for example, logic functions such as AND2 (a 2-input AND gate) and OR4 (a 4 input OR gate) and switching functions such as DFF (a D flip-flop). Inverters, NAND gates and NOR gates are also typically included in cell libraries. A standard cell library typically provides multiple cells having the same cell function (e.g., AND2) and differing in drive strength (e.g., AND2X1, AND2X2, etc.). Cells having higher drive strength generally consume more electrical power, but can be used to drive a larger load, or can be used to improve circuit speed.

Figure 1:
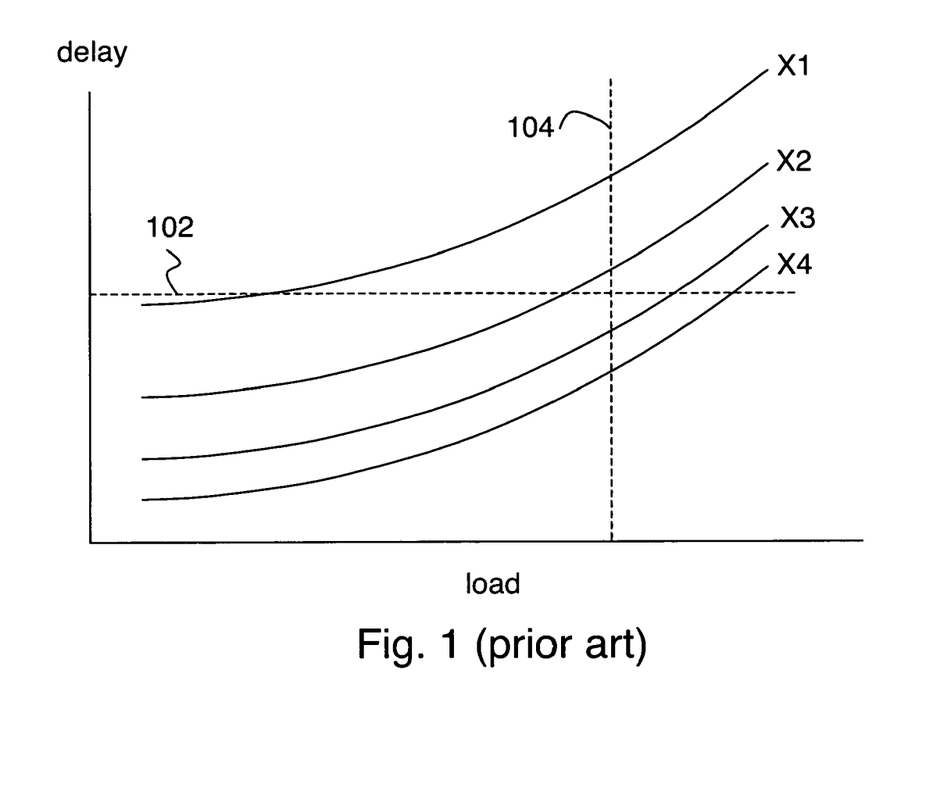
FIG. 1 shows delay vs. load for cell library cells having different drive strength and performing the same cell function.

For example, FIG. 1 schematically shows cell delay as a function of load for a set of cells performing the same function but having different drive strengths, labeled X1, X2, X3, and X4. By increasing drive strength for a fixed delay, as shown by line 102, a larger load can be driven. By increasing drive strength for a fixed load, as shown by line 104, delay can be reduced. Thus, provision of several cells having different drive strength for performing a certain function provides design flexibility in the cell library. Indeed, a cell-level design is largely a determination of which drive strength to use for each cell function required in a circuit.

Large scale circuit design is frequently formulated as a minimization of power consumption subject to constraints on circuit-level delay, which lead ultimately to constraints on cell-level delay. The relation between circuit-level delay and cell-level delay is generally complex, and is usually accounted for by an automated design tool used in the design process. One example of the complexity in relating cell-level delay to circuit-level delay is that increasing the drive strength of a particular cell Z decreases its delay, but tends to increase the load on the cell(s) Y providing input to cell Z. The increased load on cell(s) Y tends to increase their delay.

For the purposes of this description, "delay" can be a rise delay or a fall delay, or any combination thereof (e.g., an average of rise delay and fall delay). A delay can also be a switching time, or any other cell timing parameter which decreases as cell speed increases. Delays can be state-dependent (e.g., a delay from input A to output Z can depend on the state of a second input B).

Figure 2A:
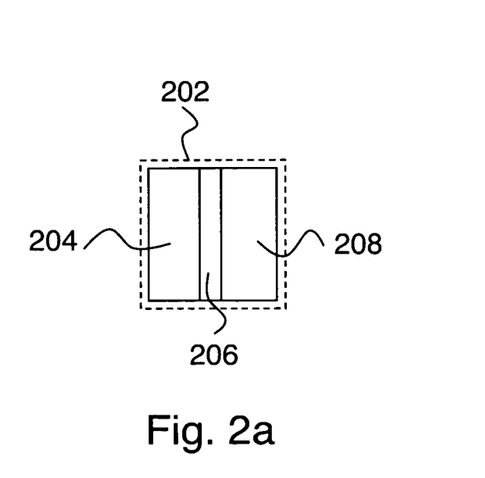
FIGS. 2a and 2b show an X1 cell and an X2 cell respectively.
Figure 2B:
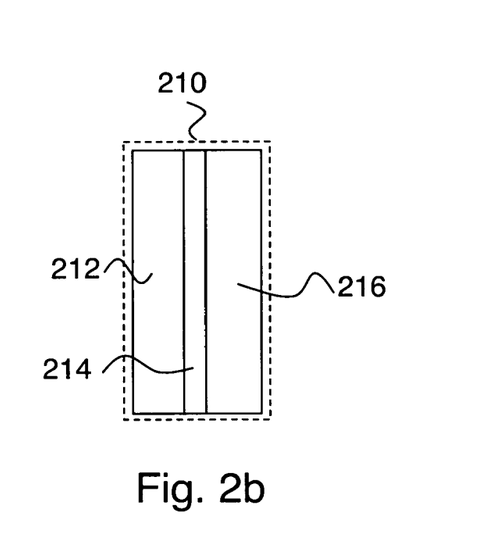

For convenience in cell library design and cell layout, the drive strengths for each cell function are usually selected to provide a predetermined scaling of total transistor active area within a cell. For example, the X2 cell typically has twice the transistor active area of the X1 cell (with similar scaling for the other drive strengths). The X2 cell is also often designed to have twice the physical area of the X1 cell (also with similar scaling for the other drive strengths), in order to simplify cell layout. For example, if the X1 cell is regarded as a "brick", then cell layout is simplified if all the larger cells have the configuration of 2 or more adjacent "bricks". An example of such a configuration is schematically shown on FIGS. 2a and 2b, corresponding to an X1 and an X2 cell respectively. On FIG. 2a, a cell 202 includes a transistor having a gate contact 206 between a source 204 and a drain 208. FIG. 2b shows a cell 210 that is twice as large as cell 202, and includes a transistor having a gate contact 214 between a source 212 and a drain 216. The width of the transistor of cell 210 is twice the width of the transistor of cell 202, and thus has twice the active area. For cells having multiple transistors, typically all of the transistors in the cell are scaled together to provide the various drive strengths.

Figure 3:
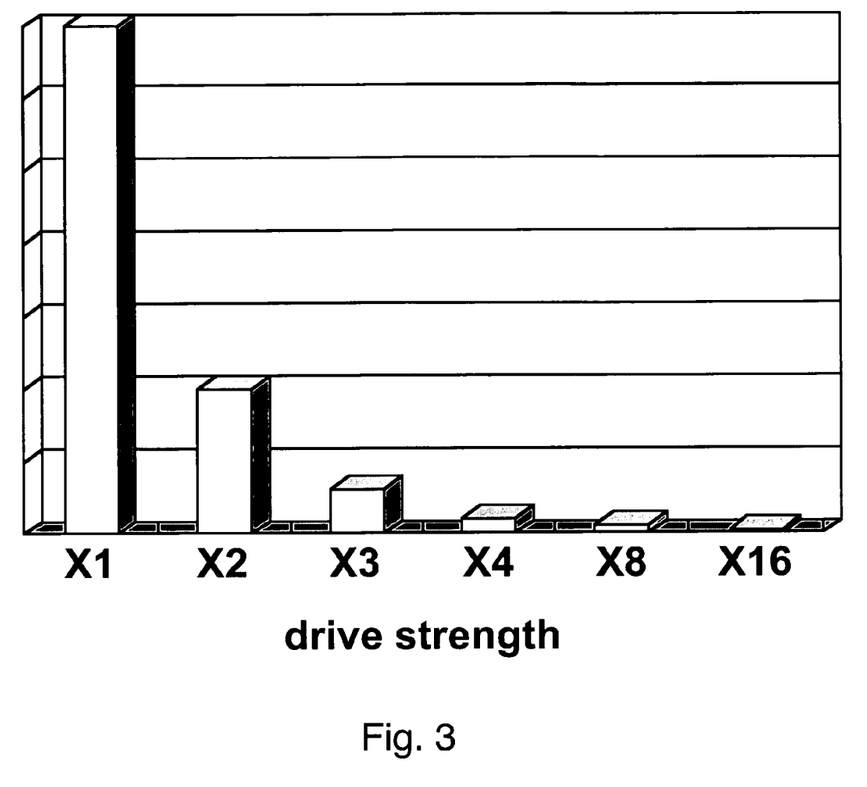
FIG. 3 shows a typical distribution of cell drive strengths in a large scale circuit design using a conventional cell library.

However, the conventional approach to providing cells having varying drive strength described above suffers from a notable drawback, in that significant cell over-design often occurs in practice. This drawback is best appreciated in connection with FIG. 3, which shows a typical distribution of cell drive strength in a large scale circuit. A noteworthy feature of FIG. 3 is that the number of cells is a steeply decreasing function of drive strength. Although the relation between circuit level delay and cell level delay is complex, as indicated above, the design automation tool is ultimately faced with a requirement to select a cell from a finite set of cells having different drive strengths, and usually selects the smallest possible cell to minimize power.

This quantization (or granularity) of cell drive strengths inherently leads to over-design. For example, if a delay corresponding to a drive strength of X1.1 is required, and the choices are X1 and X2, X2 will be chosen in order to meet the requirement. Similarly, if a drive strength of X1.9 is required, and the choices are between X1 and X2, X2 will be chosen. In the latter case, the over-design entailed by use of X2 where X1.9 would suffice is much less than in the former case, where X2 is used where X1.1 would suffice. On FIG. 3, the number of cells is a steeply decreasing function of drive strength, and it is therefore likely that most of the X2 cells are in fact significantly over-designed (i.e., more like the X1.1 example above than the X1.9 example above).

In the example where only an X1.1 cell was needed and an X2 cell had to be selected due to drive strength quantization, power consumption is unnecessarily increased by the difference in power consumption between an X2 cell and an X1.1 cell. Both switching power and leakage power are undesirably increased by such quantization. Some known design approaches inherently avoid this quantization problem, by reliance on continuous scaling of cell drive strength and/or transistor size during design. These approaches also have their drawbacks. More particularly, such approaches tend to complicate the design process and undesirably increase design time. In other words, the advantage in design simplicity offered by cell library design is partially (or even completely) lost because of further optimization required after the cell level design is complete.

For example, U.S. Pat. No. 4,827,428 considers a method for design optimization where it is assumed that transistor size (i.e., drive strength) can be continuously varied. While such an approach inherently avoids over-design due to quantization, the assumed continuous scalability of transistor sizes is also inherently much more complicated than design with standard library cells having quantized drive strengths.

It should also be noted that many prior art references are concerned with aspects of large scale circuit design independent from the over-design problem identified above. This is not surprising, since large scale circuit design is highly complex, and can therefore be approached from many different and unrelated viewpoints. For example, U.S. Pat. No. 5,724, 250 considers detailed methods and algorithms for efficient cell substitution of library cells having different drive strength in a circuit design. Such substitution algorithms do not address the quantization over-design issue identified above. As another example, U.S. Pat. No. 6,496,965 considers provision of variable drive strength cells by automatically wiring 2 or more standard cells together in parallel. While this is an alternative to providing X1, X2, etc. cells in the library, wiring cells together in parallel does not address the quantization over-design issue identified above.

Another approach is considered in U.S. Pat. No. 5,633,805, where a cell library having a two-dimensional cell sizing progression is considered, where minimum load and maximum load are treated as independent variables. In U.S. Pat. No. 5,598,347, cell libraries having cells with different drive strength but the same width are considered. Similarly, U.S. Pat. No. 5,663,662 considers a cell library having cells with different drive strength but the same physical area and terminal locations. These three approaches are also concerned with providing solutions to design problems other than the above-identified quantization over-design issue.

Accordingly, it would be an advance in the art to provide a cell library enabling reduced quantization over-design in cell level design. It would also be an advance in the art to provide such reduced over-design without adding significant complexity to the overall circuit design process.

SUMMARY

The present invention provides a cell library which enables reduced quantization induced over-design in large scale circuit design. Library cells having the same cell function have drive strengths selected to provide delays about equal to a predetermined set of design delays, at a nominal load corresponding to the cell function. In contrast, conventional cell libraries typically have drive strengths which correspond to a predetermined set of cell physical areas. Preferably, the spacing between adjacent design delays is a non-decreasing function of cell drive strength. Such spacing reduces quantization induced over-design compared to conventional cell libraries which have a design delay spacing that is a decreasing function of cell drive strength. On-chip clock distribution is an important application where cell libraries of the invention can provide significant advantages.

DETAILED DESCRIPTION

Figure 4:
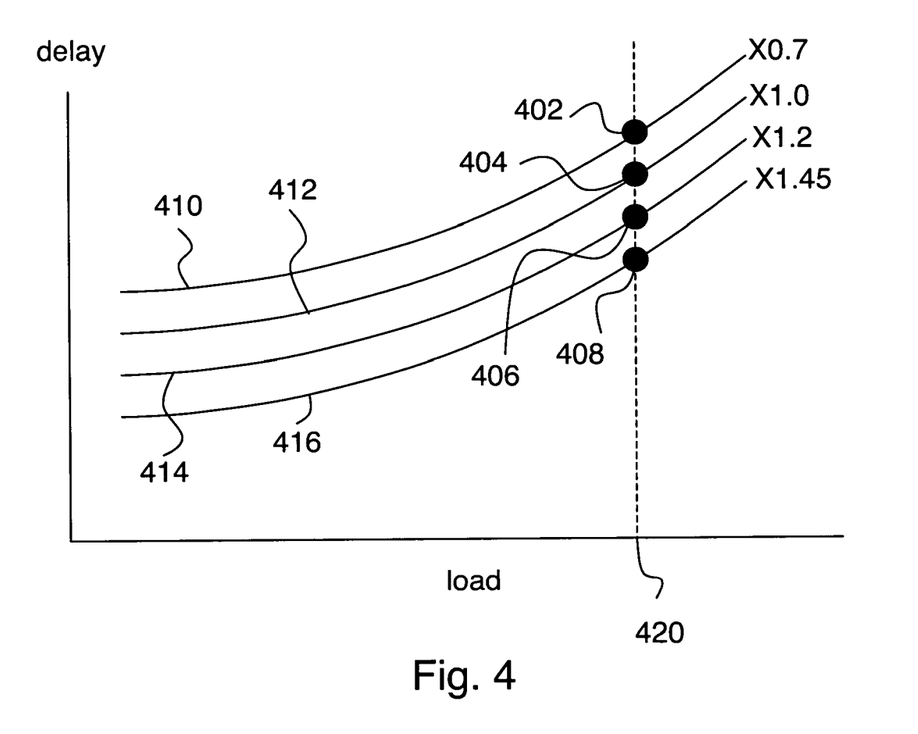
FIG. 4 shows delay vs. load for library cells in accordance with an embodiment of the invention.

FIG. 4 shows delay vs. load for library cells in accordance with an embodiment of the invention. On FIG. 4, a nominal cell function load 420 is shown by a vertical dashed line. A set of predetermined design delays, shown as 402, 404, 406, and 408 in this example, is defined on FIG. 4. Various methods for defining these design delays will be discussed below. According to the invention, drive strengths for cells performing the same cell function are selected such that cell delays at the nominal load 420 are about equal to the design delays 402, 404, 406, and 408. In other words, cell drive strengths are selected such that the corresponding delay vs. load curves 410, 412, 414, and 416 intersect the nominal load line 420 at or near points 402, 404, 406, and 408 respectively. In the example of FIG. 4, it is assumed that the drive strengths corresponding to curves 410, 412, 414, and 416 are X0.7, X1.0, X1.2, and X1.45 respectively. Here, and throughout this description, the X designation for drive strength is intended for comparison with conventional usage. Thus an X1.2 cell has 1.2 times the active area of an X1 cell, and X0.8 cell has 0.8 times the active area of an X1 cell, etc.

In the example of FIG. 4, the design delays 402, 404, 406, and 408 are about evenly spaced, which tends to reduce quantization induced over-design. For example, if a cell needs slightly more than an X1 drive strength, the next available drive strength is X1.2. Indeed, if a cell requires less than X1 drive strength, the X0.7 library cell may suffice. In either case, significant reduction of power consumption is provided by the availability of such library cells, compared to conventional libraries having X1, X2, etc. cells. Since time delay is what typically constrains the selection of drive strength, provision of library cells having delays equal to predetermined design delays (i.e., according to the invention) provides a more appropriate set of cell drive strengths than provided by conventional libraries.

For example, referring back to FIG. 1, note that the delay difference at load 104 is larger between the X1 and X2 cells than it is between the X2 and X3 cells (or between any other two adjacent cells). Thus conventional cell libraries tend to have the largest delay difference between the two most commonly used cells in typical designs (as indicated in FIG. 3). This unfortunate characteristic of conventional cell libraries leads to significant over-design in practice, since most of the cells that need more than an X1 drive strength need only slightly more than an X1 drive strength, but the next available drive strength is X2.

Although the example of FIG. 4 shows evenly spaced predetermined design delays, alternative embodiments are possible where the design delays are more closely spaced for cells having lower drive strength (which are typically more commonly used) than for cells having higher drive strength (which are typically less commonly used).

It is helpful to define the design delay spacing of a cell X as the delay difference at the nominal load between cell X and the cell having the next largest drive strength above that of cell X. Conventional cell libraries provide a design delay spacing that is a decreasing function of cell drive strength, and so the delay spacing is largest for cells having the lowest drive strength (typically the most commonly used cells). Preferable embodiments of the invention, including both alternatives considered above, provide a design delay spacing that is a non-decreasing function of cell drive strength. Such provision of minimal delay spacing for cells having the lowest drive strength is a key advantage of the invention, since the low drive strength cells are most commonly used in typical designs.

The selection of the exact value to use for nominal load 420 is not crucial for practicing the invention. Instead, a key idea of the invention is to size the library cells in accordance with delay at a given nominal load, as opposed to the conventional and arbitrary scaling of cell active area. Thus the exact value used for the nominal load 420 is not especially significant. In many cases, nominal load 420 can be a typical X1 load, since X1 loads are representative loads for a large fraction of cells in typical designs. This is to be expected, since automatic design tools tend to place connected cells close to each other to reduce delay, and the resulting short connections between cells typically do not add significant load.

Figure 5:
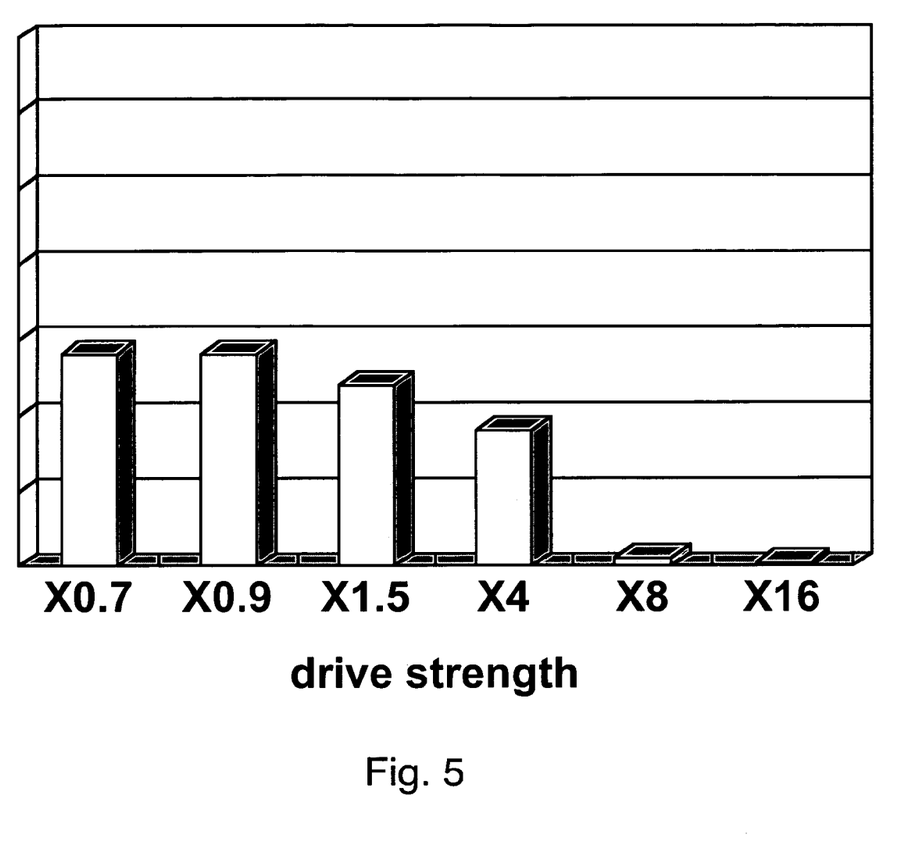
FIG. 5 shows a distribution of cell drive strengths expected in a large scale circuit design using a cell library according to an embodiment of the invention.

Selection of cell drive strength according to delay at a nominal load will tend to provide cells having drive strengths which are more evenly utilized in practice. For example, FIG. 5 shows an example of a distribution of cell drive strengths expected in a large scale circuit design using a cell library according to an embodiment of the invention. Certain advantages of the invention can be appreciated by comparing FIG. 5 to FIG. 3.

On FIG. 3, the X2 cell is used much less often than the X1 cell, the X3 cell is used much less often than the X2 cell, etc. Even though the library of FIG. 3 has six cell drive strengths, these six cell drive strengths are not equally useful, since most of them are hardly utilized at all in typical designs. In sharp contrast, the example of FIG. 5 shows six drive strengths, of which four are significantly utilized in a typical design. Quantization induced over-design is reduced in the embodiment of FIG. 5 compared to the conventional approach of FIG. 3, because the drive strengths of FIG. 5 have improved resolution where it matters (i.e., for cells which are more frequently used in typical designs).

Although conventional cell sizing (e.g., X1, X2, X3, X4, X8, and X16) may appear to provide finer drive strength resolution for small drive strengths than for large drive strengths (e.g., the difference between X1 and X2 seemingly being smaller than the difference between X8 and X16), a significant discovery of the present invention is that this impression is frequently incorrect. In terms of delay, the difference between X1 and X2 can be significantly larger than the difference between X8 and X16. Thus provision of fine drive strength resolution for small drive strength cells (e.g., X0.8, X1.3 etc.) can significantly improve design.

Note that the number of cell drive strengths for a particular function in a cell library cannot be unduly increased without adverse consequences. As the number of cell drive strengths increases, the cell library database size increases, as does the number of alternatives that are considered in the course of an automated design. Both of these factors tend to increase design time. For this reason, it is impractical to reduce quantization induced over-design by simply providing a very large number of cell drive strengths (e.g., a conventional X1, X2, etc. approach where the X1 cell is very small and typical cells are often X10 or more). Thus an important advantage of the invention is provision of a cell library having cells more appropriately and efficiently sized than cells in conventional libraries.

Figure 6A:
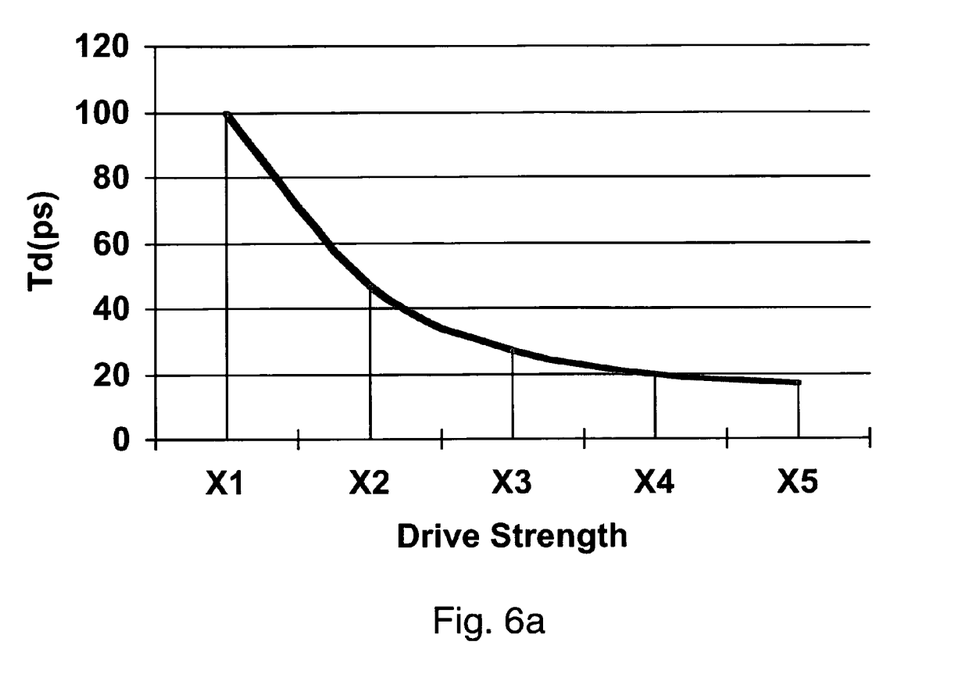
FIG. 6a shows delay vs. drive strength at a nominal load.
Figure 6B:
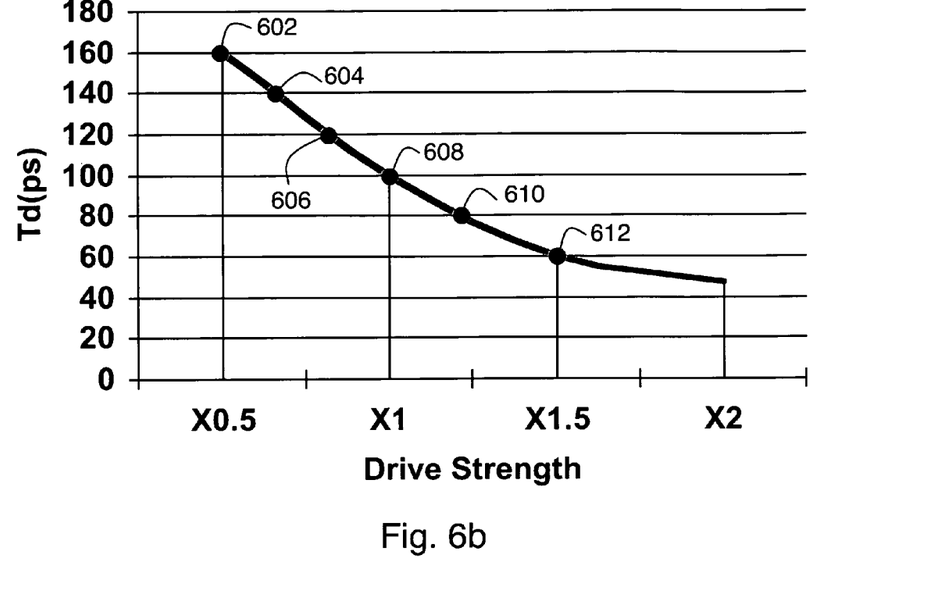
FIG. 6b shows delay vs. drive strength for library cells in accordance with an embodiment of the invention.

FIG. 6a shows delay vs. drive strength at a nominal load. The curve of FIG. 6a can be regarded as the delay vs. drive strength curve along line 104 of FIG. 1. Plots as shown in FIG. 6a provide an alternative viewpoint for appreciating aspects of the present invention. For example, FIG. 6b shows delay vs. drive strength for library cells in accordance with an embodiment of the invention. In the example of FIG. 6b, predetermined design delays 602, 604, 606, 608, 610, and 612 are defined having values of 160, 140, 120, 100, 80, and 60 ps respectively, and cell drive strengths are selected to provide delays about equal to these design delays. In the example of FIG. 6b, the corresponding drive strengths are about X0.5, X0.65, X0.8, X1.0, X1.2, and X1.5 respectively.

The example of FIG. 6b shows one way of selecting predetermined design delays, namely selecting the predetermined design delays to be equally spaced within a certain range. Preferably this range includes, as shown in FIG. 6b, commonly used drive strengths. In some cases, not all of the design delays will be equally spaced, since it may be useful to include in a cell library a largest cell for a function, for use in rare cases where no smaller cell suffices, and in such cases, there is no particular reason to enforce a relation between the delay of such a largest cell and the other cell delays. Alternatively, as indicated in connection with FIG. 4, it may be desirable to select design delays that are more closely spaced for cells having smaller drive strength than for cells having larger drive strength. Another alternative for design delay selection relies on selection of design delays according to delay variation. For example, design delays selected to provide low delay variation are suitable for cells (e.g., buffers and inverters) for chip-level clock distribution, since low delay and, more importantly, low delay variation are required for clock distribution.

A noteworthy feature of the preceding examples of embodiments of the invention is that cells having fractional drive strength are employed. For example, cells according to the invention can have drive strengths of X0.7, X0.9, X1.2, etc., as opposed to conventional integral drive strengths limited to X1, X2, X3, etc. Note that these drive strengths, as indicated above, refer to active area, such that an X2 cell has twice the active area of an X1 cell, and an X1.2 cell has 1.2 times the active area of an X1 cell, etc. However, cell active area and cell physical area do not necessarily scale together, and so in practicing the invention, various choices can be made in relating cell physical size to cell drive strength.

One approach is to minimize cell physical area, which will tend to result in each cell having a different physical area. Furthermore, these physical cell areas will not have any simple relation among them. Recall that conventional cell libraries typically provide an X2 cell that has the configuration of two X1 cells side by side (and similarly for larger cells), which significantly simplifies layout. A set of cells having fractional drive strength and minimal physical area for each drive strength will generally not have areas which are multiples of a unit area. Such cells will tend to complicate layout, and accordingly minimization of physical area for each cell drive strength is not a preferred approach for practicing the invention.

Instead, it is preferred to retain the layout simplicity provided by conventional cell libraries having a relatively small number of distinct cell physical areas. Suppose, for example, that drive strengths X0.6, X0.7, X1.2, and X1.5 are desired in a particular cell library according to the invention. If the X0.6 and X0.7 cells have the same physical area A1 and the X1.2 and 1.5 cells both have area A2, the desired layout simplicity will be obtained, since 4 cells have only 2 different areas. Preferably, these cells also have one dimension being the same (e.g., either width or height). There are various ways to ensure this. An X1 and an X2 cell can be designed having physical areas A1 and A2 respectively. Scaling of transistor sizes within the X1 cell, without changing cell physical area, can then be used to obtain the X0.6 and X0.7 cells. Similarly, scaling of transistor sizes within the X2 cell, without changing cell physical area, can be used to obtain the X1.2 and X1.5 cells. A more area-efficient alternative for this particular example is to design X0.75 and X1.5 cells having physical areas A1 and A2 respectively. Thus cells having a relatively large number of different drive strengths preferably have a relatively small number of predetermined cell physical areas.

Figure 7A:
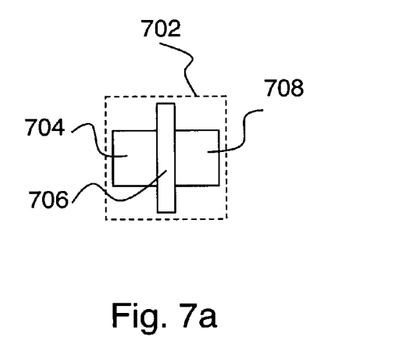
FIGS. 7a and 7b show an X0.5 cell and an X1.5 cell in accordance with a preferred embodiment of the invention.
Figure 7B:
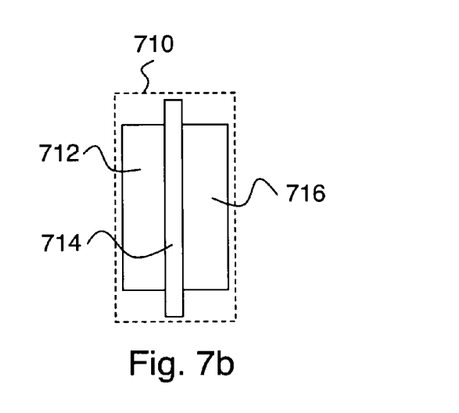

FIGS. 7a and 7b show an X0.5 cell 702 and an X1.5 cell 710 in accordance with this preferred cell physical sizing approach. The X0.5 cell 702 of FIG. 7a has the same physical area as the X1 cell 202 of FIG. 2a, and the X1.5 cell 710 of FIG. 7b has the same physical area as the X2 cell 210 of FIG. 2b. Cell 702 has a gate contact 706 between a source 704 and a drain 708. The active area of cell 702 is half the active area of cell 202 because source 704 and drain 708 have half the width of source 204 and 208 respectively. Cell 710 has a gate contact 714 between a source 712 and a drain 716. The active area of cell 710 is ¾ the active area of cell 210 because source 712 and drain 716 have ¾ the width of source 212 and 216 respectively.

When cells according to the invention and having different drive strengths are designed to have the same physical area, as in FIGS. 2a-b and 7a-b, then some cells will typically have non-minimal physical area (e.g., the 0.5X and 1.5X cells of FIGS. 7a and 7b). Cells having non-minimal physical area are usually not present in conventional cell libraries, since minimization of circuit physical area is often assumed to be a paramount design consideration. Thus, one of the discoveries of the present invention is that use of cells having non-minimal physical area can provide compensating advantages, such as ease of layout in combination with reduced quantization induced over-design.

In a preferred embodiment, a cell library of the present invention also provides active region geometrical parameter information for each cell. Use of such active region information is discussed in detail by the present inventors in a co-pending US patent application entitled "Automatic Circuit Design Method with a Cell Library Providing Transistor Size Information" filed on even date herewith and hereby incorporated by reference in its entirety. A cell library providing both active region geometrical information and having cell drive strengths selected according to delay is highly advantageous for circuit design. Provision of cells having drive strength selected according to delay reduces quantization induced over-design, and provision of active region information allows powerful automated design tools to efficiently select lower drive strength cells where appropriate.

For example, in a typical circuit design, roughly 20% of the circuit paths are timing critical, and the remaining 80% of the paths are not timing critical. Conventional cell libraries typically provide X1 as the smallest cell drive strength. Cells in paths which are not timing critical are usually the slowest available cells (e.g., X1 cells), leading to designs which typically have a very large fraction of X1 cells. Thus, over-design is commonplace in circuit paths which are not timing critical, since many X1 cells could be replaced by slower cells.

However, mere provision of slower cells having reduced power consumption in a cell library does not enable an automated design tool to efficiently utilize such cells, since power and timing analysis is typically too time-consuming to perform on non critical parts of the circuit. Thus, the active region information of this preferred embodiment enables efficient automatic utilization of slow, low-power cells by providing one or more simple parameters to the automatic design tool that correlate well with power consumption and speed. This approach can be regarded as an efficient optimization of the 80% or so of typical circuit paths that are not timing critical.

The preceding description discusses cell libraries and methods for constructing a cell library (by selecting library cell drive strengths) according to the invention. Such cell libraries can be embodied as a database on a computer-readable medium, such as a magnetic or optical disk. Accordingly, a set of computer instructions recorded on a computer-readable medium that provide a cell library as discussed above is also an embodiment of the invention.

Clock tree synthesis is an important application where the principles of the invention can be employed to improve performance. Clock distribution is subject to a stringent skew requirement to maintain synchronization across the entire chip. In conventional cell libraries, the requirement for low skew often drives the clock tree design to use very high drive strengths (e.g., 20X), since the lower drive strengths typically have a delay granularity that is too large to meet the skew requirement of clock distribution. For example, a typical cell library may have a 180 ps delay difference between 8X and 12X drive strengths, which can be too large for clock distribution. A 20X cell will have a relatively load-independent delay, which is helpful in meeting the skew requirement. However, the resulting over-design is a significant burden. In fact, on-chip clock distribution typically requires about half the total chip power.

Clock distribution can be significantly improved by making use of a cell library as in the present invention. More specifically, clock buffer cells having drive strengths selected to provide evenly and closely spaced delays can allow the use of lower drive strength cells for clock distribution. For example, a cell library according to the invention can have the same delay difference between 4X and 5X clock buffers as between 9X and 10X (or 16X and 20X) clock buffers. Meeting the skew requirement with such a library can be done with much lower drive strength cells. For example, the skew provided by 20X clock buffers in a conventional design can be matched by the skew provided by clock buffers of 6X drive strength or less. In this example, clock buffer area and leakage current are reduced by more than 60%. Dynamic power consumption is also reduced significantly.

A further advantage of this approach for clock distribution is that even delay distribution of the clock buffer cells improves clock insertion convergence during design. Although conventional circuit design includes an optimization of the skew-power trade off, automatic implementation of such optimization is significantly hampered by the uneven dependence of delay on drive strength typical of conventional cell libraries. In contrast, cell libraries of the invention having evenly spaced delays can improve the convergence of the optimization and improve the resulting designs.

The invention is applicable to any clock-related library function. Examples include clock buffers, clock inverters and clock gated cells. A clock gated cell can be disabled by a clock disable signal (e.g., by replacing a clock buffer with an AND gate having the disable signal as an input). Such disabling of part (or all) of the clock tree can be employed to reduce power consumption. A clock gated cell can have AND, NAND, OR, NOR and/or MUX (for multiple clocks) functionality.

What is claimed is:

1. A method for automatic design of a large scale circuit, the method comprising:
   providing a cell library comprising a plurality of cells providing a plurality of cell function;
   wherein said plurality of cell functions includes at least one clock-related function;

wherein each of said plurality of cell functions has a corresponding nominal cell function load;

wherein each of said plurality of cell functions is provided by three or more of said cells, each having a drive strength and a delay at said nominal cell function load depending on said drive strength;

wherein said delays are substantially equal to a set of predetermined design delays for each of said plurality of cell functions;

wherein a design delay spacing is defined for each pair of said cells performing the same one of said cell functions and having adjacent delays by taking a difference of the delays of the two cells of said pair;

wherein the design delay spacings corresponding to at least one of said plurality of cell functions do not decrease as drive strength increases; and performing a circuit design by selecting cells from said cell library according to said plurality of cell functions and said cell drive strengths.

2. The method of claim 1, wherein three or more of said predetermined design delays are about evenly spaced in time.

3. The method of claim 2, wherein said evenly spaced design delays are spaced apart by about 10 picoseconds.

4. The method of claim 1, wherein each of said plurality of cell functions is provided by one or more of said cells having physical areas substantially equal to a predetermined set of physical areas.

5. The method of claim 1, wherein a cell providing said clock-related function is selected from a group consisting of clock buffer, clock inverter, and clock gated cell.

6. A method for constructing a cell library for use in automatic design of a large scale circuit, the method comprising:

a) providing a plurality of cell functions, each having a corresponding nominal cell function load, wherein said plurality of cell functions includes at least one clock-related function;

b) providing, for each of said plurality of cell functions, three or more cells, each having a drive strength and a delay at said nominal cell function load depending on said drive strength;

c) selecting said delays to be substantially equal to a set of predetermined design delays for each of said plurality of cell functions;

wherein a design delay spacing is defined for each pair of said cells performing the same one of said plurality of cell functions and having adjacent delays by taking a difference of the delays of the two cells of said pair;

wherein the design delay spacings corresponding to at least one of said plurality of cell functions do not decrease as drive strength increases; and d) providing said, three or more cells for each of said plurality of cell functions as an output cell library.

7. The method of claim 6, wherein three or more of said predetermined design delays are about evenly spaced in time.

8. The method of claim 7, wherein said evenly spaced design delays are spaced apart by about 10 picoseconds.

9. The method of claim 6, wherein each of said plurality of cell functions is provided by one or more of said cells having physical areas substantially equal to a predetermined set of physical areas.

10. The method of claim 6, wherein a cell providing said clock-related function is selected from a group consisting of clock buffer, clock inverter, and clock gated cell.

11. A set of computer instructions recorded on a computer-readable medium and executable by a computer for providing a cell library for automatic design of a large scale circuit, the cell library comprising:

a plurality of cells providing a plurality of cell functions;

wherein said plurality of cell functions includes at least one clock-related function;

wherein each of said plurality of cell functions has a corresponding nominal cell function load;

wherein each of said plurality of cell functions is provided by three or more of said cells, each having a drive strength and a delay at said nominal cell function load depending on said drive strength;

wherein said delays are substantially equal to a set of predetermined design delays for each of said plurality of cell functions;

wherein a design delay spacing is defined for each pair of said cells performing the same one of said plurality of cell functions and having adjacent delays by taking a difference of the delays of the two cells of said pair; and wherein the design delay spacings corresponding to at least one of said plurality of cell functions do not decrease as drive strength increases.

12. The set of computer instructions of claim 11, wherein three or more of said predetermined design delays are about evenly spaced in time.

13. The set of computer instructions of claim 12, wherein said evenly spaced design delays are spaced apart by about 10 picoseconds.

14. The set of computer instructions of claim 11, wherein each of said plurality of cell functions is provided by one or more of said cells having physical areas substantially equal to a predetermined set of physical areas.

15. The set of computer instructions of claim 11, wherein a cell providing said clock-related function is selected from a group consisting of clock buffer, clock inverter, and clock gated cell.

* * * * *